(12) United States Patent
Huang (10) Patent No.: US 11,916,578 B2
(45) Date of Patent: Feb. 27, 2024

(54) RADIO FREQUENCY CIRCUIT, TERMINAL DEVICE, AND SIGNAL TRANSMISSION METHOD

(71) Applicant: JRD Communication (Shenzhen) LTD., Shenzhen (CN)

(72) Inventor: Fan Huang, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 144 days.

(21) Appl. No.: 17/618,508

(22) PCT Filed: Dec. 17, 2019

(86) PCT No.: PCT/CN2019/126099
§ 371 (c)(1),
(2) Date: Dec. 13, 2021

(87) PCT Pub. No.: WO2021/097978
PCT Pub. Date: May 27, 2021

(65) Prior Publication Data
US 2022/0239319 A1   Jul. 28, 2022

(30) Foreign Application Priority Data
Nov. 18, 2019   (CN) .......................... 201911127913.9

(51) Int. Cl.
*H04B 1/00* (2006.01)
*H04B 1/3827* (2015.01)
*H04B 1/44* (2006.01)

(52) U.S. Cl.
CPC .......... *H04B 1/0064* (2013.01); *H04B 1/3833* (2013.01); *H04B 1/44* (2013.01)

(58) Field of Classification Search
CPC ....... H04B 1/0064; H04B 1/3833; H04B 1/44
See application file for complete search history.

(56) References Cited

U.S. PATENT DOCUMENTS 9,654,151 B2   5/2017   Khlat et al.
2018/0152955 A1   5/2018   Park et al.
(Continued)

FOREIGN PATENT DOCUMENTS

CN   103559524   2/2014
CN   105207709   12/2015
(Continued)

OTHER PUBLICATIONS

International Search Report and the Written Opinion dated Aug. 7, 2020 From the International Searching Authority Re. Application No. PCT/CN2019/126099 and Its Translation of Search Report Into English. (8 Pages).
(Continued)

*Primary Examiner* — Nguyen T Vo (57) ABSTRACT

The application provides a radio frequency circuit, including a radio frequency module, a first combiner, a second combiner, a main antenna, and a secondary antenna. The main antenna is connected to the radio frequency module through the first combiner, and the secondary antenna is connected to the radio frequency module through the second combiner, wherein the radio frequency module transmits a main antenna signal of at least one frequency band to the secondary antenna through the second combiner, and transmits a secondary antenna signal corresponding to the frequency band to the main antenna through the first combiner.

17 Claims, 2 Drawing Sheets

(56) References Cited

U.S. PATENT DOCUMENTS

| | | | | |
|---|---|---|---|---|
| 2020/0127742 A1* | 4/2020 | Seong | ............... | H04B 1/18 |
| 2020/0168182 A1* | 5/2020 | Ebihara | ............ | H04M 1/72454 |
| 2021/0410093 A1* | 12/2021 | Ren | ............... | H04B 17/336 |

FOREIGN PATENT DOCUMENTS

| | | |
|---|---|---|
| CN | 105281819 | 1/2016 |
| CN | 105656509 | 6/2016 |
| CN | 106100686 | 11/2016 |
| CN | 107425888 | 12/2017 |
| CN | 108512957 | 9/2018 |
| CN | 109412667 | 3/2019 |
| CN | 109831223 | 5/2019 |
| CN | 109981119 | 7/2019 |
| WO | WO 2012/081475 | 6/2012 |

OTHER PUBLICATIONS

Notification of Office Action and Search Report dated Sep. 24, 2021 From the State Intellectual Property Office of the People's Republic of China Re. Application No. 201911127913.9 and Its Translation of Office Action Into English. (15 Pages).

\* cited by examiner

RADIO FREQUENCY CIRCUIT, TERMINAL DEVICE, AND SIGNAL TRANSMISSION METHOD

RELATED APPLICATIONS

This application is a National Phase of PCT Patent Application No. PCT/CN2019/126099 having International filing date of Dec. 17, 2019, which claims the benefit of priority of Chinese Patent Application No. 201911127913.9 filed on Nov. 18, 2019. The contents of the above applications are all incorporated by reference as if fully set forth herein in their entirety.

FIELD AND BACKGROUND OF THE INVENTION

The present application is related to wireless communication, and in particular, to a radio frequency (RF) circuit, a terminal device, and a signal transmission method.

Conventional terminal products usually comprise a main antenna and a secondary antenna. For mobile phones and other communication products, the main antenna is generally arranged at a lower end, and the secondary antenna is arranged at an upper end. Under normal circumstances, the main antenna is responsible for receiving and transmitting a main antenna signal, while the secondary antenna is only responsible for receiving a secondary antenna signal. When a call is made, however, the lower end of the product is usually handled by a user hand, which may considerably affect transmission of the main antenna signal. In conventional solutions, a multi-in-multi-out switch is added in hardware circuit to control a signal transmission path, so as to prevent an influence of human hands on signal transmission and reception. However, the multi-in-multi-out switch may induce additional power consumption and cost.

SUMMARY OF THE INVENTION

Embodiments of the application provide a radio frequency circuit, a terminal device and a signal transmission method, featuring the capability to prevent influences caused by human hands on signal transmission and reception without the need for any additional hardware deployment, such that the signal attenuation and cost addition caused by the multi-in-multi-out switch can be prevented.

The embodiment of the application provides a radio frequency circuit, comprising: a radio frequency module, a first combiner, a second combiner, a main antenna, and a secondary antenna. The main antenna is connected to the radio frequency module through the first combiner, and the secondary antenna is connected to the radio frequency module through the second combiner, and the radio frequency module transmits the main antenna signal of at least one frequency band to the secondary antenna via the second combiner, and the secondary antenna signal of the corresponding frequency band is transmitted to the main antenna through the first combiner.

In the radio frequency circuit of the present application, the types of the first combiner and/or the second combiner comprise a dual frequency combiner, a triple frequency combiner or a quad frequency combiner.

In the radio frequency circuit of the application, the first combiner and the second combiner both comprise at least two input ends and one output end. The output end of the first combiner is connected to the main antenna, the at least two input ends of the first combiner are connected to the radio frequency module, the output end of the second combiner is connected to the secondary antenna, and the at least two input ends of the second combiner are connected to the radio frequency module.

In the radio frequency circuit of the present application, the radio frequency module comprises a radio frequency transceiver for receiving and transmitting radio frequency signals.

In the radio frequency circuit of the application, the radio frequency module also comprises a power amplifier for amplifying the radio frequency signal transmitted by the radio frequency transceiver.

In the radio frequency circuit of the application, the radio frequency module also comprises a front-end module. The front-end module comprises a switch and a radio frequency filter, wherein the switch is configured to switch between radio frequency signal transmission and reception, and the radio frequency filter is configured to filter the radio frequency signal.

The embodiment of the application also provides a terminal device, comprising a radio frequency circuit, the radio frequency circuit comprises: a radio frequency module, a first combiner, a second combiner, a main antenna, and a secondary antenna. The main antenna is connected to the radio frequency module through the first combiner, and the secondary antenna is connected to the radio frequency module through the second combiner. Wherein, the radio frequency module transmits the main antenna signal of at least one frequency band to the secondary antenna through the second combiner, and transmits the secondary antenna signal of the corresponding frequency band to the main antenna through the first combiner.

In the terminal device of the present application, the types of the first combiner and/or the second combiner comprise a dual frequency combiner, a triple frequency combiner or a quad frequency combiner.

In the terminal device of the application, the first combiner and the second combiner both comprise at least two input ends and one output end, the output end of the first combiner is connected to the main antenna, the at least two input ends of the first combiner are connected to the radio frequency module, the output end of the second combiner is connected to the secondary antenna, and the at least two input ends of the second combiner are connected to the radio frequency module.

In the terminal device of the present application, the terminal device also comprises a sensor for monitoring the holding state of the terminal device.

In the terminal device of the application, the sensor comprises a pressure sensor. When the pressure value of the pressure sensor is greater than a preset value, the holding state is in the held state.

In the terminal device of the application, the main antenna is arranged below the terminal device, the secondary antenna is arranged above the terminal device, and the sensor is arranged below the terminal device.

In the terminal device of the present application, the radio frequency module comprises a radio frequency transceiver for receiving and transmitting radio frequency signals.

In the terminal device of the present application, the radio frequency module also comprises a power amplifier for amplifying the radio frequency signal transmitted by the radio frequency transceiver.

In the terminal device of the application, the radio frequency module also comprises a front-end module, the front-end module comprises a switch and a radio frequency filter, wherein the switch is configured to switch between reception of the radio frequency signal and transmission of the radio frequency signal, and the radio frequency filter is configured to filter the radio frequency signal.

The embodiment of the application also provides a signal transmission method, which is applicable to a radio frequency circuit. The radio frequency circuit comprises a radio frequency module, a first combiner, a second combiner, a main antenna, and a secondary antenna. The main antenna is connected to the radio frequency module through the first combiner, the secondary antenna is connected to the radio frequency module through the second combiner, and the signal transmission method comprises the following steps.

It is checked whether the main antenna is hand held.

If so, a target frequency band is determined from at least one frequency band of signals pending on transmission; and The main antenna signal of the target frequency band is transmitted to the secondary antenna through the second combiner, and the secondary antenna signal of the target frequency band is transmitted to the main antenna through the first combiner.

If not, main antenna signals of all frequency band of signals pending on transmission are transmitted to the main antenna through the first combiner, and secondary antenna signals of all the frequency band of signals pending on transmission are transmitted to the secondary antenna through the second combiner.

In the signal transmission method of the present application, the step of checking whether the main antenna is hand held, further comprises the following steps.

It is detected whether a signal strength of the main antenna is changed.

If so, and the signal strength changes from strong to weak, it is judged that the main antenna is hand held.

If not, the main antenna is not hand held.

In the signal transmission method of the present application, the radio frequency circuit also comprises a sensor, which is configured to detect a pressure value of the main antenna. The step of checking whether the main antenna is hand held, specifically comprises the following steps.

When the pressure value is greater than a preset value, it is judged that the main antenna is hand held.

When the pressure value is less than or equal to the preset value, it is judged that the main antenna is not hand held.

In the signal transmission method of the present application, the target frequency band is determined from at least one frequency band of signals pending on transmission, specifically by the following steps.

The strengths of the main antenna signal of the frequency band of signals pending on transmission is determined.

The at least one frequency band of signals pending on transmission is sorted in an order based on the strengths from weak to strong.

A preceding Nth frequency band of the sorted frequency band of signals pending on transmission is taken as the target frequency band. Where N is a preset number.

In the signal transmission method of the present application, when there are multiple frequency band of signals pending on transmission, after the steps of transmitting the main antenna signal of the target frequency band to the secondary antenna through the second combiner, and transmitting the secondary antenna signal of the target frequency band to the main antenna through the first combiner, the signal transmission method further comprises the following steps.

The remaining main antenna signals of the frequency band of signals pending on transmission are transmitted to the main antenna via the first combiner, and The remaining secondary antenna signals of the frequency band of signals pending on transmission are transmitted to the secondary antenna via the second combiner.

Embodiments of the application have proposed the radio frequency circuit, terminal device, and signal transmission method. The radio frequency circuit comprises a radio frequency module, a first combiner, a second combiner, a main antenna, and a secondary antenna. The main antenna is connected to the radio frequency module through the first combiner, and the secondary antenna is connected to the radio frequency module through the second combiner, wherein the radio frequency module transmits a main antenna signal of at least one frequency band through the second combiner, and transmits a secondary antenna signal of the corresponding frequency band to the main antenna through the first combiner, so that the main antenna signal can be directly transmitted from the secondary antenna, without the need to control a multi-in-multi-out switch, the influence of holding the main antenna on the antenna performance can be prevented, and the attenuation of the antenna signal caused by the multi-in-multi-out switch and the increase of the cost caused by the multi-in-multi-out switch are prevented.

BRIEF DESCRIPTION OF THE SEVERAL VIEWS OF THE DRAWINGS

To explain the technical solution more clearly in the embodiment of the application, the following descriptions briefly introduce the drawings needed in the description of the embodiment. Obviously, the drawings in the following description are only some embodiments of the application. For those skilled in the art, other drawings can be obtained according to these drawings without paying creative labor.

DESCRIPTION OF SPECIFIC EMBODIMENTS OF THE INVENTION

The following description of the embodiments is referred to the attached illustrations to illustrate specific embodiments that can be implemented by the present application. The directional terms mentioned in the application, such as [up], [down], [front], [back], [left], [right], [inside], [outside], [side], etc., are only the directions referring to the additional schema. Therefore, the directional language is adaptable to explain and understand the application, rather than to limit the application. In the graph, cells with similar structure are represented by the same label.

It should be noted that the thickness and shape in the drawings of the application do not reflect the true proportion, and the purpose is only to illustrate the contents of the embodiment of the application.

Figure 1:
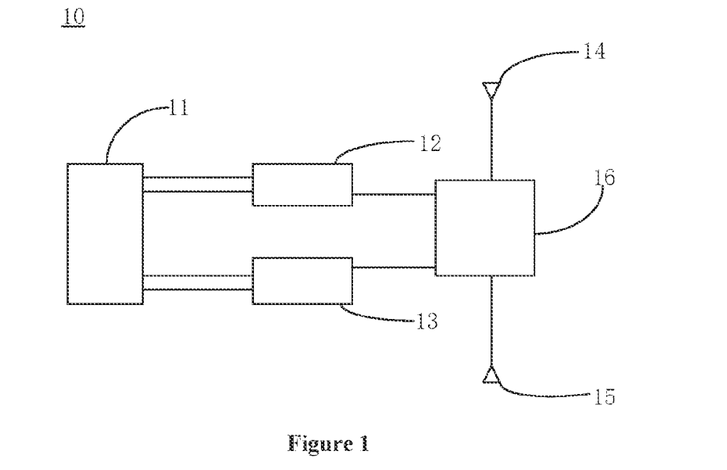
FIG. 1 shows a structural diagram of an existing radio frequency circuit according to an embodiment of the present application.

Please refer to FIG. 1, which is a structural diagram of an existing radio frequency circuit according to an embodiment of the present application. As shown in FIG. 1, the existing radio frequency circuit 10 comprises a radio frequency module 11, a first combiner 12, a second combiner 13, a main antenna 14, a secondary antenna 15, and a multi-in-multi-out switch 16. The existing terminal products usually have the main antenna 14 and the secondary antenna 15. For mobile phones and other communication products, the main antenna 14 is generally arranged at the lower end, and the secondary antenna 15 is arranged at the upper end. Under normal circumstances, the main antenna 14 is responsible for receiving and transmitting the main antenna signal, while the secondary antenna 15 only receives the secondary antenna signal. However, when a call is established, user hands may hold the lower end of the product, which has a considerable impact on the main antenna transmitting the main antenna signal. Therefore, the existing technology controls the signal transmission path by arranging a multi-in-multi-out switch 16 in the hardware circuit, so as to prevent the influence of human hands on signal transmission and reception. However, the multi-in-multi-out switch 16 may cause certain power loss and cost addition. To solve the issue, a technical solution adopted in the present application provides a radio frequency circuit, so that the main antenna signal is transmitted directly from the secondary antenna, without control of the multi-in-multi-out switch, thus preventing the antenna signal attenuation and cost addition caused by the multi-in-multi-out switch, and furthermore, the influence on the antenna performance when the main antenna is hand held can also be prevented.

Figure 2:
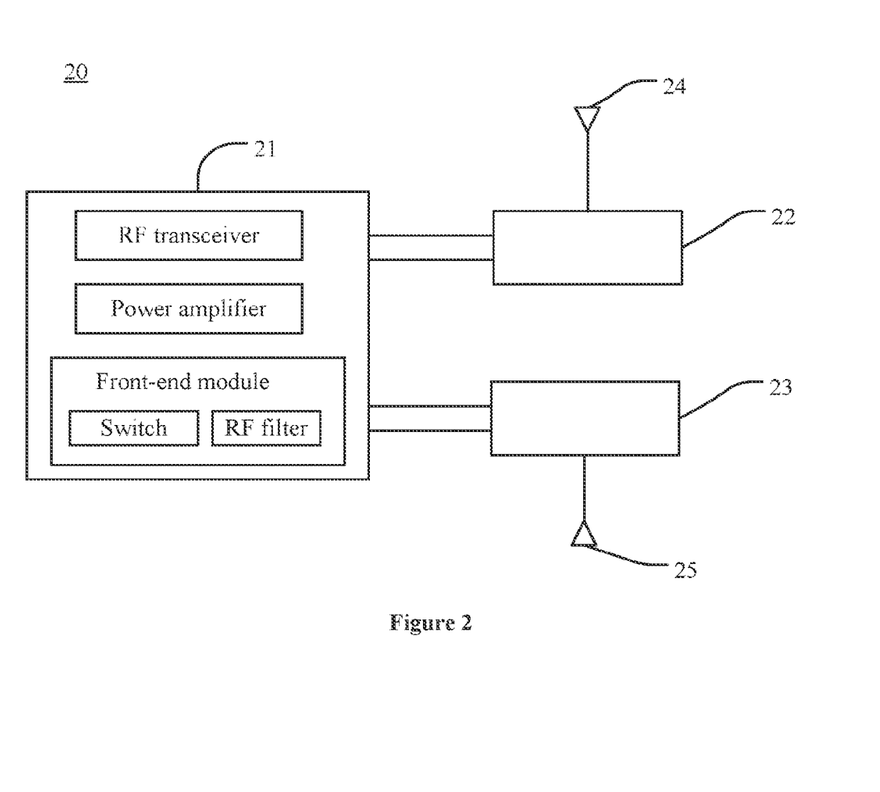
FIG. 2 shows a structural diagram of a radio frequency circuit according to an embodiment of the present application.

Please refer to FIG. 2, which is a structural diagram of a radio frequency circuit according to an embodiment of the present application. As shown in FIG. 2, the radio frequency circuit 20 comprises a radio frequency module 21, a first combiner 22, a second combiner 23, a main antenna 24, and a secondary antenna 25. The main antenna 24 is connected to the radio frequency module 21 through the first combiner 22, and the secondary antenna 25 is connected to the radio frequency module 21 through the second combiner 23, wherein the radio frequency module 21 transmits the main antenna signal of at least one frequency band to the secondary antenna 25 through the second combiner 23. The secondary antenna signal of the corresponding frequency band is transmitted to the main antenna 24 via the first combiner 22.

Wherein, the radio frequency module 21 comprises a radio frequency transceiver (not shown in the figure).

A radio frequency transceiver is the core processing unit of mobile phone radio frequency, which mainly comprises a receiving unit and a transmitting unit. The former one accomplishes amplification, filtering, and down conversion of received signal, and finally outputs a baseband signal. Generally, zero intermediate frequency (IF) and digital low intermediate frequency are adopted to realize the conversion from radio frequency to baseband. The latter one accomplishes up conversion, filtering, and amplification of the baseband signal, and mainly realizes a conversion from the baseband signal to a radio frequency signal by a secondary frequency conversion. When the radio frequency transceiver receives the signal, the receiving unit receives the signal (about 800 Hz-3 GHz) from the antenna. After amplification, filtering, and synthesis, the radio frequency signal is reduced to baseband, and then the baseband signal is processed. When the radio frequency transceiver transmits the signal, the baseband below 20 kHz is raised and converted into the signal of the RF band for transmission.

The radio frequency module 21 also comprises a power amplifier (not shown in the figure).

The power amplifier (PA) is configured to amplify the radio frequency signal output by the radio frequency transceiver. The field of power amplifier is an independent field with threshold. It is also a component that cannot be integrated in the mobile phone. Meanwhile, the power amplifier is also the most important component in the mobile phone. Various characteristics such as the performance, the occupied area, the call quality, the phone strength, and the battery life are all dependent on the power amplifier.

The radio frequency module 21 also comprises a front-end module (not shown in the figure).

A front-end module integrates a switch and an RF filter to achieve antenna switch between transmission and reception, band selection, and filtering of transmission/reception radio frequency signals. In the frequency band below 2 GHz, many RF front-end modules have gradually become the mainstream in silicon integrated circuit design such as complementary metal oxide semiconductor (CMOS), bipolar junction transistor (BJT), silicon germanium (SiGe), or bipolar complementary metal oxide semiconductor (bipolar CMOS). As the process of silicon integrated circuit is mature and allows for the design of large and complex circuits, which can be designed together with intermediate frequency and baseband circuits, it has great development potential, and allows other heterostructure transistors to emerge in special application circuits. However, in the frequency band above 5 GHz, its performance of low noise, high power output, and power increase efficiency is far inferior to that of GaAs field effect transistor. At present, the GaAs field effect crystal control process is still superior in the performance of electrical functions. In the past, the RF front-end module circuit design is focused on the design of power amplifier, endeavored on low-voltage operation, high-power output, and high-power increase efficiency to achieve the requirement of power saving while using low-voltage batteries in a compact outfit design. However, in the circumstances where digital modulation techniques are massively adopted, it is crucial to research on how to keep a good linear modulation efficiency.

In the embodiment, the types of the first combiner 22 and the second combiner 23 comprise a dual frequency combiner, a triple frequency combiner, or a quad frequency combiner.

In a wireless mobile communication system, the combiner is mainly used to combine the input multi band signals together and output the signals to the same indoor distribution system.

For example, in the radio antenna system, after combining several input and output signals of different frequency bands (such as 145 MHz and 435 MHz) through the combiner, a feeder is configured to connect with the radio station, which not only saves one feeder, but also prevents the trouble of switching different antennas.

The types of dual frequency combiners are as follows:

(1) GSM & 3G dual frequency combiner is a two-in-one-out device. The Global System for mobile communications (GSM) signal (885-960 MHz) and third generation mobile communication technology (3G) signal (1920-2170 MHz) can be combined.

(2) DCS & 3G dual frequency combiner is a two-in-one-out device. The distributed control system (DCS) signal (1710-1880 MHz) and 3G signal (1920-2170 MHz) can be combined.

(3) (TETRA/iDEN/CDMA/GSM) & (DCS/PHS/3G/WLAN) dual frequency combiner is a two-in-one-out device. One of the ports covers (trans European trunked radio (TETRA)/Integrated Digital Enhanced Network (iDEN), code division multiple Access (CDMA) and GSM system frequency band (800-960 MHz), can input TERTRA/iDEN, CDMA, GSM or any combination of signals; the other port covers DCS, personal handy phone system (PHS), 3G and WLAN. The system frequency band (1710-2500 MHz) can input DCS, PHS, 3G, WLAN or any combination signal.

The types of triple frequency combiner are as follows:

(1) GSM & DCS & 3G triple frequency combiner is a three-in-one-out device. The GSM (885-960 MHz), DCS (1710-1880 MHz) and 3G (1920-2170 MHz) signals can be combined.

(2) GSM & 3G & WLAN triple frequency combiner is a three-in-one-out device. The GSM (885-960 MHz), 3G (1920-2170 MHz) and WLAN (2400-2500 MHz) signals can be combined.

The types of quad frequency combiners are as follows:

GSM & DCS & 3G & WLAN quad frequency combiner is a four-in-one-out device. It can combine GSM (885-960 MHz), DCS (1710-1880 MHz), 3G (1920-2170 MHz) and WLAN (2400-2483.5 MHz) signals.

In the embodiment, the first combiner 22 and the second combiner 23 both comprise at least two input ends and one output end, the output end of the first combiner 22 is connected to the main antenna 24, the at least two input ends of the first combiner 22 are connected to the radio frequency module 21, the output end of the second combiner 23 is connected to the secondary antenna 25, and the at least two input ends of the second combiner 23 are connected to the radio frequency module 21.

In the embodiment, the types of the first combiner 22 and the second combiner 23 are the same. For example, when there are two bands of signals pending to be transmitted, the first combiner 22 and the second combiner 23 are dual frequency combiners. The combination method can not only make the dual frequency signals combine, but also prevent the waste of resources.

Unlike prior arts, the radio frequency circuit provided by the present application comprises a radio frequency module, a first combiner, a second combiner, a main antenna, and a secondary antenna. The main antenna is connected to the radio frequency module through the first combiner, and the secondary antenna is connected to the radio frequency module through the second combiner, wherein the radio frequency module transmits the main antenna signal of at least one frequency band to the secondary antenna through the second combiner. The secondary antenna signal corresponding to the frequency band is transmitted to the main antenna through the first combiner, so that the main antenna signal is directly transmitted from the secondary antenna, and the influence on performance caused by holding the main antenna can be prevented without the control of the multi-in-multi-out switch, thus preventing the antenna signal attenuation and cost increase caused by the multi-in-multi-out switch.

Figure 3:
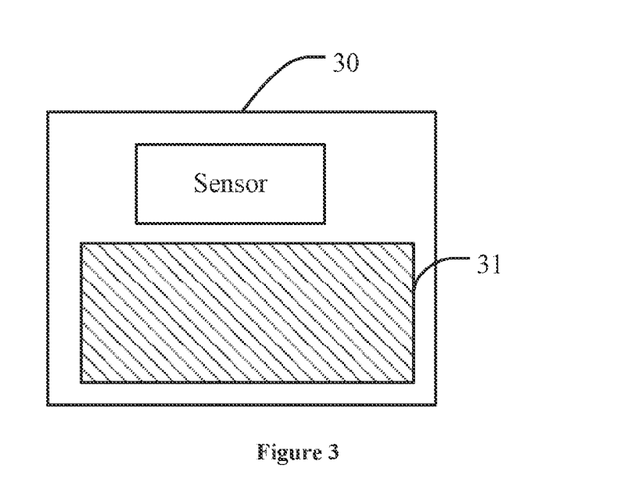
FIG. 3 is a structural diagram of a terminal device according to an embodiment of the present application.

Please refer to FIG. 3, which is a structural diagram of a terminal device according to an embodiment of the present application. The embodiment of the application also provides a terminal device, and the terminal device 30 comprises any of the above radio frequency circuits 31.

In the embodiment, the terminal device 30 also comprises a sensor (not shown in the figure) for detecting the holding state of the terminal device 30.

The sensor is a kind of detection device, which can sense the measured information and transform the sensed information into electrical signal or other required information output according to certain rules, so as to meet the requirements of information transmission, process, storage, display, record, and control. The characteristics of the sensor comprise miniaturization, digitization, intellectualization, multi-function, systematization, and networking. The sensor is the primary key to achieve automatic detection and automatic control.

In the embodiment, the sensor comprises a pressure sensor. When the pressure value of the pressure sensor is greater than a preset value, the holding state of the terminal device 30 is assessed as hand held.

Pressure sensor is a device or artifact that can sense the pressure signal and convert the pressure signal into usable output electrical signal according to certain rules.

In the embodiment, the main antenna (not shown in the figure) is arranged below the terminal device 30, and the secondary antenna (not shown in the figure) is arranged above the terminal device 30. The sensor is arranged below the terminal device 30, which is the position of the main antenna. By arranging the sensor below the mobile terminal 30, the grip of the mobile terminal 30 monitored can represent the holding state of the main antenna.

It should be pointed out that some manufacturers have arranged the main antenna on the top of the mobile phone on their high-end models, so as to prevent the impact of the main antenna signal when users usually use the mobile phone when they mainly hold their hands under the mobile phone.

Unlike the prior art, the terminal device in the embodiment comprises the radio frequency circuit provided by the application. The radio frequency circuit comprises a radio frequency module, a first combiner, a second combiner, a main antenna, and a secondary antenna. The main antenna is connected to the radio frequency module through the first combiner, and the secondary antenna is connected to the radio frequency module through the second combiner, wherein the radio frequency module may connect to the main antenna signal is transmitted to the secondary antenna through the second combiner, and the secondary antenna signal of the corresponding frequency band is transmitted to the main antenna through the first combiner, so that the main antenna signal is directly transmitted from the secondary antenna, and the influence on the performance caused by holding the main antenna can be prevented without the control of the multi-in-multi-out switch, thus preventing the antenna signal attenuation and cost increases caused by the multi-in-multi-out switch.

Figure 4:
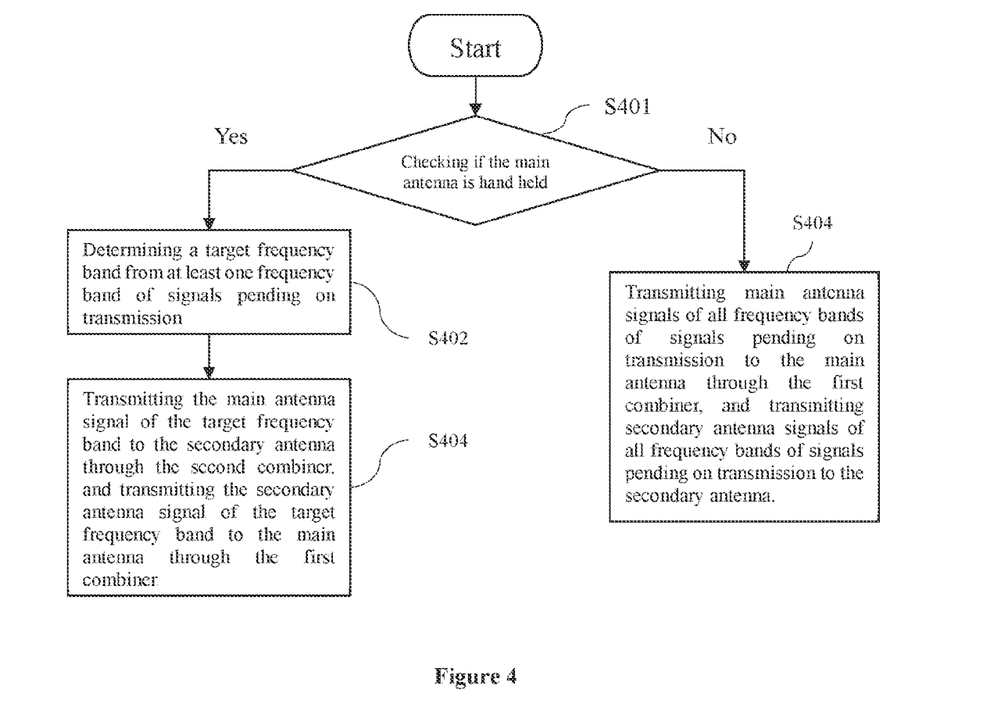
FIG. 4 is a flowchart of a signal transmission method according to an embodiment of the present application.

In addition, the embodiment of the application also provides a signal transmission method, which is applied to a radio frequency circuit. The radio frequency circuit comprises a radio frequency module, a first combiner, a second combiner, a main antenna, and a secondary antenna, wherein the main antenna is connected to the radio frequency module through the first combiner, and the secondary antenna is connected to the radio frequency module through the second combiner. As shown in FIG. 4, a flowchart of the provided signal transmission method comprises the following steps.

In step S401: Detecting whether the main antenna is hand held. If so, the following step S402 is performed. Conversely, if not, step S403 is performed.

When the main antenna is held by a person, signals of the main antenna may be rapidly weakened or even interrupted. Therefore, it is possible to determine whether the main antenna is hand held by detecting the strengths of the signals. In addition, a sensor can also be used to detect whether the main antenna is hand held. The sensor is a kind of detection device, which can sense the measured information and transform the sensed information into electrical signal or other required information output according to certain rules, so as to meet the requirements of information transmission, process, storage, display, record, and control.

The characteristics of the sensor comprise miniaturization, digitization, intellectualization, multi-function, systematization, and networking. The sensor is the crucial foundation to enable automatic detection and automatic control.

In step S402: a target frequency band is determined from the current at least one frequency band of signals pending on transmission.

Specifically, step S402 may comprise the following sub steps:
1-1: Determining strengths of the main antenna signal of at least one frequency band of signals pending on transmission;
1-2: Sorting the at least one frequency band of signals pending on transmission by an order corresponding to the determined strengths from weak to strong;
1-3: selecting a preceding Nth frequency band from the sorted frequency band of signals pending on transmission as the target frequency band, wherein N is a preset number.

In step S403, the main antenna signal of the target frequency band is transmitted to the secondary antenna through the second combiner, and the secondary antenna signal of the target frequency band is transmitted to the main antenna through the first combiner.

In the embodiment, when the frequency band of signals pending on transmission is plural, after step S403, all main antenna signals of remaining frequency bands of signals pending on transmission are transmitted to the main antenna via the first combiner, and all secondary antenna signals of remaining frequency bands of signals pending on transmission are transmitted to the secondary antenna through the second combiner.

In step S404: the main antenna signal of all frequency bands of signals pending on transmission is transmitted to the main antenna through the first combiner, and the secondary antenna signal of all frequency bands of signals pending on transmission is transmitted to the secondary antenna.

Unlike the prior art, the signal transmission method in the embodiment is applied to a radio frequency circuit, which comprises a radio frequency module, a first combiner, a second combiner, a main antenna, and a secondary antenna. The main antenna is connected to the radio frequency module through the first combiner, and the secondary antenna is connected to the radio frequency module through the second combiner. The signal transmission method comprises: detecting whether the main antenna is hand held; if so, a target frequency band is determined from at least one frequency band of signals pending on transmission; and the main antenna signal of the target frequency band is transmitted to the secondary antenna through the second combiner, and the secondary antenna signal of the target frequency band is transmitted to the main antenna through the first combiner. Conversely, if the main antenna is not hand held, all main antenna signals of the frequency band of signals pending on transmission are transmitted to the primary antenna through the first combiner, while all secondary antenna signals of the frequency band of signals pending on transmission are transmitted to the secondary antenna. In the method, the frequency band considerably affected by user hands is taken as the target frequency band, and the main antenna signal of the target frequency band is directly transmitted to the secondary antenna, so that the signal of the main antenna held by user hands is directly transmitted from the secondary antenna. The influence of holding the main antenna on the performance of the antenna can be prevented without the control of the multi-in-multi-out switch, so as to prevent the antenna signal attenuation and the cost increase caused by the multi-in-multi-out switch.

In addition to the above implementation exceptions, the present application may also have other implementation modes. All technical solutions formed by equivalent replacement or equivalent replacement fall within the scope of protection required by the application.

To sum up, although the preferred embodiment has been disclosed in the application, the above preferred embodiment is not used to limit the application. Ordinary technical personnel in the art can make various changes and refinements without departing from the spirit and scope of the application. Therefore, the scope of protection of the application is subject to the scope defined in the claims. The specific implementation of the above operations can be seen in the previous embodiment and may not be repeated here.

To sum up, although the application has disclosed the above with preferred embodiments, the above preferred embodiments are not intended to limit the application. Ordinary technical personnel in the art can make various modifications and refinements without departing from the spirit and scope of the application. Therefore, the scope of protection of the application is subject to the scope defined in the claims.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A radio frequency circuit, comprising: a radio frequency module, a first combiner, a second combiner, a main antenna directly connected to the first combiner and connected to the radio frequency module through the first combiner, and a secondary antenna directly connected to the second combiner and connected to the radio frequency module through the second combiner; wherein the first combiner and the second combiner both receive a main antenna signal of at least one frequency band and a secondary antenna signal of a corresponding frequency band; the radio frequency module transmits the main antenna signal to the main antenna via the first combiner and transmits the secondary antenna signal to the secondary antenna through the second combiner in an ordinary operation; and the radio frequency module transmits the main antenna signal to the secondary antenna via the second combiner and transmits the secondary antenna signal through the first combiner when a signal transmission of the main antenna is influenced.

2. The radio frequency circuit according to claim 1, wherein the first combiner and/or the second combiner comprise a dual frequency combiner, a triple frequency combiner, or a quad frequency combiner.

3. The radio frequency circuit according to claim 1, wherein:
the first combiner and the second combiner both comprise at least two input ends and one output end;
the output end of the first combiner is connected to the main antenna;
the at least two input ends of the first combiner are connected to the radio frequency module;
the output end of the second combiner is connected to the secondary antenna; and the at least two input ends of the second combiner are connected to the radio frequency module.

4. The radio frequency circuit according to claim 1, wherein the radio frequency module comprises:
a radio frequency transceiver for receiving and transmitting radio frequency signals; and
a power amplifier for amplifying radio frequency signals transmitted by the radio frequency transceiver.

5. The radio frequency circuit according to claim 4, wherein the radio frequency module also comprises a front-end module, the front-end module comprises a switch and a radio frequency filter, wherein the switch is configured to switch between radio frequency signals transmission and reception, and the radio frequency filter is configured to filter the radio frequency signal.

6. A terminal device, comprising the radio frequency circuit,
wherein the radio frequency circuit comprises:
a radio frequency module;
a first combiner;
a second combiner;
a main antenna, directly connected to the first combiner; and
a secondary antenna, directly connected to the second combiner;
wherein the main antenna is connected to the radio frequency module through the first combiner, and
the secondary antenna is connected to the radio frequency module through the second combiner; and
wherein the first combiner and the second combiner both receive a main antenna signal of at least one frequency band and a secondary antenna signal of a corresponding frequency band; the radio frequency module transmits the main antenna signal to the main antenna via the first combiner and transmits the secondary antenna signal to the secondary antenna through the second combiner in an ordinary operation; and the radio frequency module transmits the main antenna signal to the secondary antenna via the second combiner and transmits the secondary antenna signal through the first combiner when a signal transmission of the main antenna is influenced.

7. The terminal device according to claim 6, wherein the first combiner and/or the second combiner comprise a dual frequency combiner, a triple frequency combiner, or a quad frequency combiner.

8. The terminal device according to claim 6, wherein:
the first combiner and the second combiner both comprise at least two input ends and one output end;
the output end of the first combiner is connected to the main antenna;
the at least two input ends of the first combiner are connected to the radio frequency, module;
the output end of the second combiner is connected to the secondary antenna; and
the at least two input ends of the second combiner are connected to the radio frequency module.

9. The terminal device according to claim 6, wherein:
the terminal device further comprises a sensor for monitoring a holding state of the terminal device;
the sensor comprises a pressure sensor;
when a pressure value of the pressure sensor is greater than a preset value, the holding state is in a held state; and
when the pressure value of the pressure sensor is less than or equal to the preset value the holding state is not held.

10. The terminal device according to claim 6, wherein the radio frequency module comprises a radio frequency transceiver for receiving and transmitting radio frequency signals.

11. The terminal device according to claim 10, wherein the radio frequency module further comprises a power amplifier for amplifying radio frequency signals transmitted by the radio frequency transceiver.

12. The terminal device according to claim 10, wherein the radio frequency module also comprises a front-end module, the front-end module comprises a switch and a radio frequency filter, wherein the switch is configured to switch between reception of the radio frequency signal and transmission of the radio frequency signal, and the radio frequency filter is configured to filter the radio frequency signal.

13. A signal transmission method adaptable for a radio frequency circuit, wherein the radio frequency circuit comprises a radio frequency module, a first combiner, a second combiner, a main antenna, and a secondary antenna; the main antenna is directly connected to the first combiner and connected to the radio frequency module through the first combiner, and the secondary antenna is directly connected to the second combiner and connected to the radio frequency module through the second combiner; the signal transmission method comprising:
detecting whether the main antenna is hand held;
if the main antenna is hand held, determining a target frequency band from at least one frequency band of signals pending on transmission, and transmitting a main antenna signal of the target frequency band to the secondary antenna through the second combiner, and transmitting a secondary antenna signal of the target frequency band to the main antenna through the first combiner;
if the main antenna is not hand held, transmitting main antenna signals of all frequency band of signals pending on transmission to the main antenna through the first combiner,
and transmitting secondary antenna signals of all frequency band of signals pending on transmission to the secondary antenna through the second combiner;
wherein the first combiner and the second combiner both receive the main antenna signal of the target frequency band and the secondary antenna signal of the target frequency band.

14. The signal transmission method according to claim 13, wherein the step of detecting whether the main antenna is hand held further comprises:
detecting whether a signal strength of the main antenna is changed;
if the signal strength of the main antenna is changed from strong to weak, deeming the main antenna as hand held; and
if not, deeming the main antenna as not hand held.

15. The signal transmission method according to claim 13, wherein the radio frequency circuit also comprises a sensor, the sensor is configured to detect a pressure value of the main antenna, and the step of detecting whether the main antenna is hand held further comprises:
when the pressure value is greater than a preset value, deeming the main antenna as hand held; and
when the pressure value is less than or equal to the preset value, deeming the main antenna as not hand held.

16. The signal transmission method according to claim 13, wherein the target frequency band is determined from at least one frequency band of signals pending on transmission, specifically comprising:
- determining strengths of the main antenna signal of the at least one frequency band of signals pending on transmission;
- sorting the at least one frequency band of signals pending on transmission by an order corresponding to the determined strengths from weak to strong; and
- selecting a preceding Nth frequency band from the sorted frequency band of signals pending on transmission as the target frequency band, wherein N is a preset number.

17. The signal transmission method according to claim 9, wherein when the at least one frequency band of signals pending on transmission is plural, after transmitting the main antenna signal of the target frequency band to the secondary antenna through the second combiner, and transmitting the secondary antenna signal of the target frequency band to the main antenna through the first combiner, the signal transmission method further comprises:
- transmitting remaining main antenna signals of the at least one frequency band of signals pending on transmission to the main antenna via the first combiner; and
- transmitting remaining secondary antenna signals of the at least one frequency band of signals pending on transmission to the secondary antenna via the second combiner.

* * * * *